United States Patent
Boxwell et al.

(10) Patent No.: US 10,970,339 B2
(45) Date of Patent: Apr. 6, 2021

(54) GENERATING A KNOWLEDGE GRAPH USING A SEARCH INDEX

(71) Applicant: INTERNATIONAL BUSINESS MACHINES CORPORATION, Armonk, NY (US)

(72) Inventors: Stephen A. Boxwell, Columbus, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 15/804,890

(22) Filed: Nov. 6, 2017

(65) Prior Publication Data
US 2019/0108226 A1    Apr. 11, 2019

Related U.S. Application Data

(63) Continuation of application No. 15/726,214, filed on Oct. 5, 2017.

(51) Int. Cl.
*G06F 16/00* (2019.01)
*G06F 16/93* (2019.01)
*G06F 16/28* (2019.01)
*G06F 16/33* (2019.01)
(Continued)

(52) U.S. Cl.
CPC ........ *G06F 16/93* (2019.01); *G06F 16/24575* (2019.01); *G06F 16/288* (2019.01); *G06F 16/3344* (2019.01); *G06F 16/9024* (2019.01)

(58) Field of Classification Search
CPC .... G06F 16/93; G06F 16/288; G06F 16/3344; G06F 16/9024; G06F 16/24575; G06F 16/24; G06F 16/43; G06F 16/903; G06F 16/951
See application file for complete search history.

(56) References Cited

U.S. PATENT DOCUMENTS

| | | | | |
|---|---|---|---|---|
| 7,567,957 | B2 * | 7/2009 | Ferrari | G06F 16/954 |
| 7,849,080 | B2 * | 12/2010 | Chang | G06Q 30/02 707/723 |
| 9,477,759 | B2 | 10/2016 | Keysar et al. | |

(Continued)

OTHER PUBLICATIONS

Anonymously; "A Privacy Protected and Personalized Push Based Social Knowledge Search System with Live Content Creation"; http://ip.com/IPCOM/000228165D; Jun. 10, 2013.
(Continued)

*Primary Examiner* — Noosha Arjomandi
(74) *Attorney, Agent, or Firm* — Conley Rose, P.C.

(57) ABSTRACT

A computer-implemented method that includes receiving a search query and, after receiving the search query, identifying a first subset of documents that include the search query by searching, based on the search query, an inverted index of a corpus of documents that includes the first subset of documents. The computer-implemented method additionally includes processing the first subset of documents to identify entities related to the search query and relations between the entities and the search query. The computer-implemented method additionally includes generating a knowledge graph based on the entities and the relations.

19 Claims, 6 Drawing Sheets

(51) Int. Cl.
*G06F 16/901* (2019.01)
*G06F 16/2457* (2019.01)

(56) References Cited

U.S. PATENT DOCUMENTS

| | | | |
|---|---|---|---|
| 9,514,223 B1 | 12/2016 | Garrett | |
| 9,535,960 B2 | 1/2017 | Guo | |
| 9,600,769 B1 | 3/2017 | Liu et al. | |
| 9,632,654 B1 | 4/2017 | Elassaad | |
| 10,445,352 B2* | 10/2019 | Vee | G06Q 50/01 |
| 2004/0249809 A1* | 12/2004 | Ramani | G06K 9/6892 |
| 2008/0256039 A1* | 10/2008 | Chang | G06Q 30/0277 |
| 2008/0256059 A1* | 10/2008 | Chang | G06Q 30/02 |
| 2009/0210389 A1 | 8/2009 | Firestein | |
| 2011/0040776 A1* | 2/2011 | Najm | G06F 16/3326 |
| | | | 707/766 |
| 2014/0304278 A1 | 10/2014 | Kleiman et al. | |
| 2015/0254344 A1* | 9/2015 | Kulkarni | G06F 16/951 |
| | | | 707/747 |
| 2016/0012125 A1* | 1/2016 | Franceschini | G06F 16/325 |
| | | | 707/735 |
| 2016/0012336 A1 | 1/2016 | Franceschini | |
| 2016/0055184 A1* | 2/2016 | Fokoue-Nkoutche | |
| | | | G06F 16/213 |
| | | | 707/809 |
| 2016/0063106 A1* | 3/2016 | Chai | G06F 16/951 |
| | | | 707/722 |
| 2016/0342681 A1* | 11/2016 | Kesin | G06F 16/367 |
| 2018/0082183 A1* | 3/2018 | Hertz | G06F 16/9024 |
| 2018/0113865 A1 | 4/2018 | Najork | |
| 2018/0293327 A1 | 10/2018 | Miller | |
| 2019/0034813 A1 | 1/2019 | Das | |
| 2019/0138640 A1* | 5/2019 | Pal | G06F 16/27 |
| 2019/0147084 A1* | 5/2019 | Pal | G06F 40/205 |
| | | | 707/769 |
| 2019/0258631 A1* | 8/2019 | Pal | G06F 16/2425 |

OTHER PUBLICATIONS

Blanco, R. et al.; "A Method for Federated Entity Search Using On-The-Fly Consolidation"; http://ip.com/IPCOM/000233848D; Dec. 24, 2013.
Anonymously; "Simultaneous Expert, Project, and Document Search Using Knowledge Graph"; http://ip.com/IPCOM/000242152D; Jun. 19, 2015.
Office Action dated Dec. 11, 2019, U.S. Appl. No. 15/726,214 filed Oct. 5, 2017, 15 pages.
Notice of Allowance dated May 15, 2020, U.S. Appl. No. 15/726,214, filed Oct. 5, 2017, 18 pages.
Appendix P, Documents Treated as Related, dated Jul. 31, 2020, 2 pages.

* cited by examiner

GENERATING A KNOWLEDGE GRAPH USING A SEARCH INDEX

BACKGROUND

The present disclosure relates to knowledge graph generation. Techniques for generating knowledge graphs involve a large amount of up-front processing. For example, techniques for generating knowledge graphs run a full natural language processing stack over every passage in a corpus to extract knowledge for the knowledge graph, making the techniques slow and inefficient.

SUMMARY

According to an embodiment of the present disclosure, a computer-implemented method includes receiving a search query. After receiving the search query, the computer-implemented method includes identifying a first subset of documents that include the search query by searching, based on the search query, an inverted index of a corpus of documents that includes the first subset of documents. The computer-implemented method further includes processing the first subset of documents to identify entities related to the search query and relations between the entities and the search query. The computer-implemented method further includes generating a knowledge graph based on the entities and the relations.

DETAILED DESCRIPTION

Figure 1:
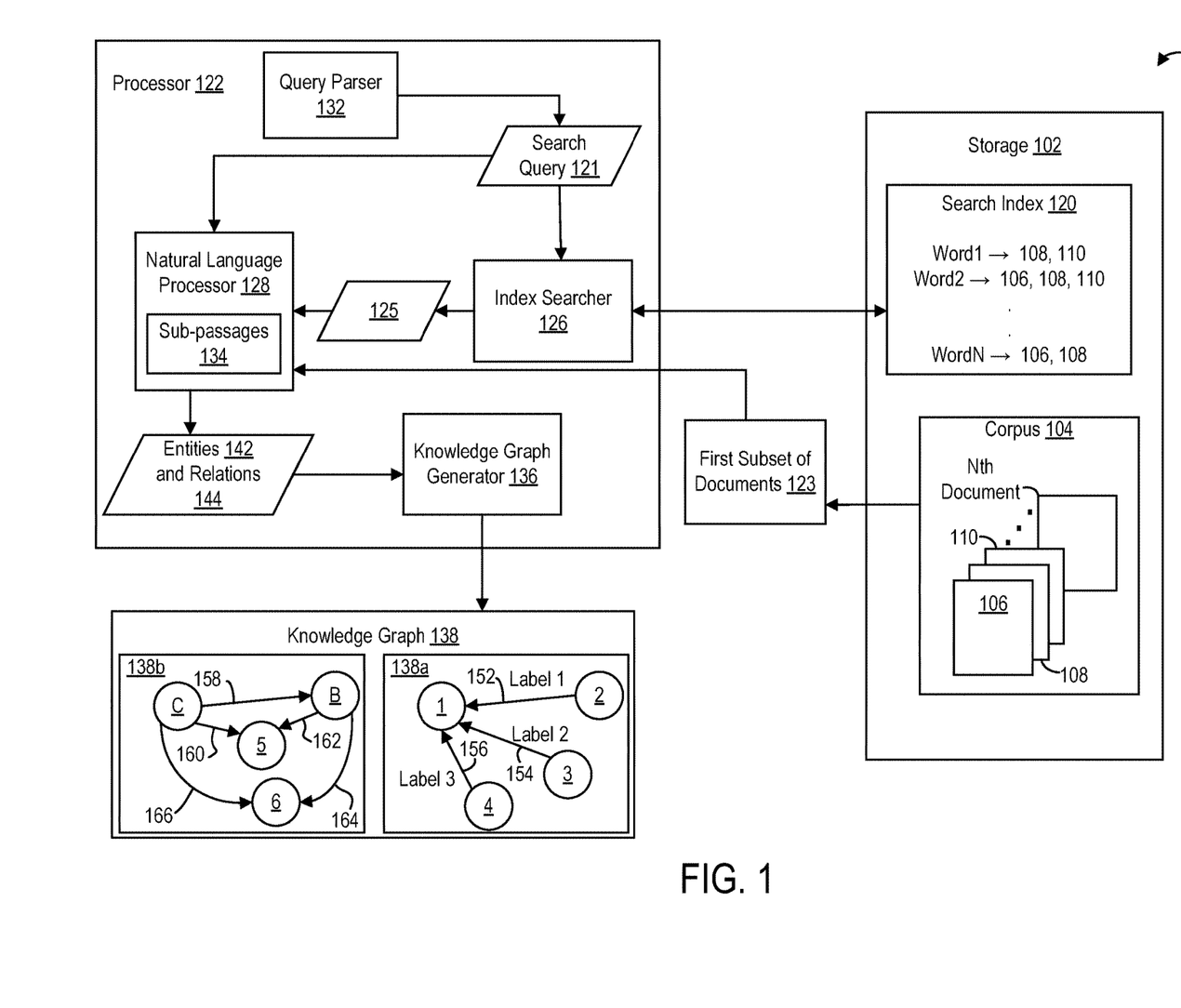
FIG. 1 shows an illustrative block diagram of a system configured to generate a knowledge graph using a search index.

With reference now to FIG. 1, a block diagram of a system 100 configured to generate one or more knowledge graphs in real time is illustrated. The system 100 includes a storage 102 that stores a corpus 104 of documents (e.g., N documents, where N is greater than or equal to two). In the example illustrated in FIG. 1, the corpus 104 of documents includes documents 106, 108, 110 . . . N (e.g., where N is greater than three). The storage 102 corresponds to or includes a tangible device that can retain and store the corpus 104. The storage 102 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the storage 102 includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The system 100 also includes a search index 120. In some examples, the search index 120 is embodied or stored in the storage 102. However, in other embodiments, the search index 120 is stored on a different storage than the storage 102. The search index 120 corresponds to or includes an inverted index that maps from content (e.g., words or numbers) of the corpus 104 to its locations in corresponding documents of the corpus 104 that include the content. For example, the search index 120 may include N mappings including a first mapping that indicates that the documents 108, 110 include first content "Word(s)1," a second mapping that indicates that the documents 106, 108, 110 include second content "Word(s)2," and an Nth mapping that indicates that the documents 106, 108 include Nth content "Word(s)N." In some examples, the search index 120 is generated using Apache Lucene™. However, the search index 120 may be generated using other search engine or other search index generating techniques.

The system 100 additionally includes a processor 122 coupled (e.g., physically or via a wireless or wired network) to the search index 120 and the corpus 104 (e.g., coupled to the storage 102). In some examples, the storage 102 is collocated with the processor 122. For example, the storage 102 may be coupled to the processor 122 via a bus or other physical connector. In other examples, the storage 102 is remotely located from the processor 122. For example, the processor 122 may be included in a user equipment (such as a personal computer, tablet, or mobile phone), and the storage 102 may be embodied in a server that the user equipment communicates with via a wired or wireless network. The processor 122 is configured to receive a search query 121. In the example illustrated in FIG. 1, the processor 122 includes a query parser 132 configured to parse a query input (e.g., entered by a user via a user input) to provide the search query 121. The query input includes one or more entities. In some examples, the query input corresponds to a question that includes the one or more entities. The query parser 132 is configured to parse the query input to identify the one or more entities in the query input. In an embodiment, the query parser 132 is configured to determine the subject, predicate, and object of the query input in order to identify the one or more entities. In an embodiment, the query parser 132 is also configured to perform tokenization and segmentation, morpholexical analysis, semantic analysis, and syntactic analysis. In some examples, the query parser 132 also includes a part-of-speech (POS) tagger to tag the parts of speech such as noun, verb, adjective, adverb, qualifier/intensifier, determiner, preposition, subordinating conjunction, and coordinating conjunction in order to identify the one or more entities.

In some examples, the search query 121 corresponds to the one or more entities from the query input. As non-limiting examples, the one or more entities of the search query 121 may correspond to one or more persons, places, or things, and may be real or abstract. To illustrate, as an example, the search query 121 may correspond to the spaceship "USS Enterprise" from the fictional television show and movie "Star Trek." As another example, the search query 121 may include multiple entities (e.g., one or more pairs of entities). To illustrate, as an example, the search query 121 may include or correspond to "Cassius" and "Brutus."

The processor 122 includes an index searcher 126 configured to, after (e.g., responsive to) receiving the search query 121, search the search index 120 according to the search query 121 to determine a first subset of documents 123 that include the search query 121. The first subset of documents 123 includes fewer documents than the corpus 104 of documents. The index searcher 126 may output search results 125 (e.g., document identifications (IDs)) that identify the first subset of documents 123.

To illustrate using the above example in which the search query 121 corresponds to the entity "USS Enterprise," the Word(s)N in the search index 120 may correspond to "USS Enterprise," and the index searcher 126 may search the search index 120 and determine that the documents 106, 108 include the search query 121 based on the search index entry for the Word(s)N. In this example, the first subset of documents 123 identified by the index searcher 126 correspond to the documents 106, 108. In this example, the index searcher 126 outputs the search results 125 (e.g., document IDs) identifying the documents 106, 108.

To illustrate using the above example in which the search query 121 corresponds to Cassius and Brutus, the Word(s)1 in the search index 120 may correspond to Cassius, and the Word(s)2 in the search index 120 may correspond to Brutus. In this example, the index searcher 126 searches the search index 120 and determines that the documents 108, 110 include the search query 121 based on the search index entries for the Word(s)1 and the Word(s)2 indicating that the documents 108, 110 include the Word(s)1 and the Word(s)2. In this example, the first subset of documents 123 identified by the index searcher 126 correspond to the documents 108, 110. In this example, the index searcher 126 may output the search results 125 (e.g., document IDs) identifying the documents 108, 110.

The processor 122 includes a natural language processor 128 configured to retrieve or receive the search query 121 and the first subset of documents 123, process (after receiving the search query 121) the first subset of documents 123 to determine entities 142 and relations 144 that are related to the search query 121, and provide/output the entities 142 and the relations 144. In some examples, the natural language processor 128 is configured to receive the search results 125 from the index searcher 126 and retrieve the first subset of documents 123 from the corpus 104. In these examples, in response to receiving the search results 125 from the index searcher 126, the natural language processor 128 may access the corpus 104 to retrieve the first subset of documents 123, and may process the first subset of documents 123 to determine one or more entities 142 and relations 144 that are related to the search query 121. In some examples, the natural language processor 128 is configured to process the first subset of documents 123 to identify the entities 142 using dictionary lookups against outside databases (e.g., DBPedia or Freebase), using a heuristic technique based on capitalization patterns, or using the output of a syntactic parser, such as a slot grammar (SG) parser (which will group first and last names into a single token, based on the overall syntax of the phrase). However, in other examples, different techniques are used to identify the entities 142. In some examples, the natural language processor 128 is configured to process the first subset of documents 123 to identify the relations 144 using a syntactic parser (such as an SG parser) that will identify common syntactic patterns, statistical techniques like those used in a syntactic parser such as International Business Machines Corporation's (IBM™) Statistical Information and Relation Extraction (SIRE) toolkit, or graph-based post-processing of complex relations based on those syntactic relations. In an example of a graph-based post-processing of complex relations, the natural language processor 128 includes an automatic annotator that marks a relation between two words that are connected by syntactic relations. These syntactic patterns can either be handwritten or inferred from training data.

To illustrate using the above example in which the search query 121 corresponds to "USS Enterprise" and the first subset of documents 123 corresponds to the documents 106, 108, the natural language processor 128 may process the documents 106, 108 and determine, based on the processing, that the entities "Jean-Luc Picard," "William Riker," and "Spock" are entities related to the entity USS Enterprise in the search query 121. In this example, the entities 142 correspond to Jean-Luc Picard, William Riker, and Spock. Additionally or alternatively, the natural language processor 128 may process the documents 106, 108 and determine, based on the processing, relations between the entities Jean-Luc Picard, William Riker, and Spock and the search query 121 USS Enterprise. For example, the natural language processor 128 may process the documents 106, 108 and determine a first relation "captain of" between Jean-Luc Picard and the search query 121 USS Enterprise, a second relation "first officer of" between William Riker and the search query 121 USS Enterprise, and a third relation "science officer of" between Spock and the search query 121 USS Enterprise. In this example, the relations 144 include captain of, first officer of, and science officer of.

As another example, to illustrate using the above example in which the search query 121 corresponds to Cassius and Brutus and the first subset of documents 123 corresponds to the documents 108, 110, the natural language processor 128 may process the documents 108, 110 and determine, based on the processing, that the entities "Hellespont" and "Battle of Philippi" are entities related to the entities Cassius and Brutus in the search query 121. In this example, the entities 142 correspond to Hellespont and Battle of Philippi. Additionally or alternatively, the natural language processor 128 may process the documents 108, 110 and determine, based on the processing, relations between the entities Cassius and Brutus of the search query 121, and relations between the entities Cassius and Brutus and the entities Hellespont and Battle of Philippi. For example, the natural language processor 128 may process the documents 108, 110 and determine a "co-conspirators" relation between Cassius and Brutus. As another example, the natural language processor 128 may process the documents 108, 110 and determine that the relations 144 include a first relation "traveled to" between Cassius and Hellespont, a second relation "fought in" between Cassius and Battle of Philippi, a third relation "traveled to" between Brutus and Hellespont, and a fourth relation "fought in" between Brutus and Battle of Philippi.

In some examples, the natural language processor 128 is configured to perform multithreading to process the first subset of documents 123 in parallel to identify the entities 142 and the relations 144. For example, the processor 122 may be configured to execute multiple processes or threads concurrently, where each of the multiple processes or threads is configured to perform the natural language processing on a corresponding document of the first subset of documents 123.

In some examples, the natural language processor 128 is configured to identify sub-passages 134 that include the search query 121 before processing the first subset of documents 123 to determine the entities 142 and the relations 144. In some examples, each of the sub-passages 134 corresponds to a sentence. A total number of the sub-passages 134 is less than a total number of sub-passages in the first subset of documents 123. For example, the first subset of documents 123 may include X sub-passages (e.g., sentences), and the sub-passages 134 may include Y sub-passages, where X is greater than Y. In examples that identify the sub-passages 134, the natural language processor 128 limits its natural language processing regarding the search query 121 to the sub-passages 134 (e.g., as opposed to performing natural language processing on the entirety of the first subset of documents 123). For example, the natural language processor 128 may perform an initial search of the first subset of documents 123 using a text search technique to identify sub-passages 134 that include the search query 121, and may then process the sub-passages 134 using natural language processing to determine the entities 142 and the relations 144. In some examples, the initial search of the first subset of documents 123 may include a full-text search of the first subset of documents 123 to identify the sub-passages 134. Some examples of open source software to perform a full-text search include Apache Lucene™, Apache Solr, and Elasticsearch. However, in other examples, different full-text search techniques or software is used. The initial search (e.g., the text search) of the first subset of documents 123 to identify the sub-passages 134 may be performed using a relatively quick process compared to the natural language processing used to identify the entities 142 and the relations 144, and may reduce the number of passages that the natural language processor 128 processes in order to identify the entities 142 and the relations 144, thereby reducing a processing time as compared to a natural language processor 128 that processes all passages of the first subset of documents 123 to identify the entities 142 and the relations 144. Furthermore, in some examples, the natural language processor 128 may process the sub-passages 134 independently. In these examples, the natural language processor 128 may be configured to perform multithreading to process the sub-passages 134 in parallel to identify the entities 142 and the relations 144. For example, the processor 122 may be configured to execute multiple processes or threads concurrently, where each of the multiple processes or threads is configured to perform the natural language processing on a corresponding sub-passage of the sub-passages 134.

The processor 122 includes a knowledge graph generator 136 configured to generate, after receiving the search query 121, a knowledge graph 138 based on the one or more entities 142 and the relations 144. The knowledge graph 138 includes nodes and directed edges. The nodes represent the entities 142 (e.g., all subjects and objects) and the one or more entities 142 in the search query 121. The directed edges represent relations between the one or more entities 142 in the search query 121, the relations between the one or more entities 142 in the search query 121 and the entities 142, and/or the relations 144 between the entities 142. The direction of an edge indicates whether the entities associated with the edge occur as subjects or objects, i.e., an edge points from the subject to the object. In some examples, different relations are represented via different types of edges (also called edge labels). FIG. 1 illustrates several example knowledge graphs 138a and 138b of the knowledge graph 138.

The knowledge graph 138a illustrates an example of the knowledge graph 138 that may be generated using the above example in which the search query 121 corresponds to USS Enterprise, the entities 142 include Jean-Luc Picard, William Riker, and Spock, and the relations 144 include "captain of," "first officer of," and "science officer of." In this example, the knowledge graph 138a includes a node 1 corresponding to the search query 121, a node 2 corresponding to Jean-Luc Picard, a node 3 corresponding to William Riker, and a node 4 corresponding to Spock. The knowledge graph 138a includes a directed edge 152, a directed edge 154, a directed edge 156, a Label 1 associated with the directed edge 152, a Label 2 associated with the directed edge 154, and a Label 3 associated with the directed edge 156. In this example, the Label 1 indicates that the relation represented by the directed edge 152 corresponds to "captain of," the Label 2 indicates that the relation represented by the directed edge 154 corresponds to "first officer of," and the Label 3 indicates that the relation represented by the directed edge 156 corresponds to "science officer of."

The knowledge graph 138b illustrates an example of the knowledge graph 138 that may be generated using the above example in which the search query 121 includes the entities Brutus and Cassius, the entities 142 include Hellespont and Battle of Philippi, and the relations 144 include "co-conspirator," "traveled to," and "fought in." In this example, the knowledge graph 138b includes a node C and a node B corresponding to the entities Cassius and Brutus of the search query 121, a node 5 corresponding to Hellespont, and a node 6 corresponding to Battle of Philippi. The knowledge graph 138b includes a directed edge 158, a directed edge 160, a directed edge 162, a directed edge 164, and a directed edge 166. The knowledge graph 138b may also include a label associated with the directed edge 158, a label associated with the directed edge 160, a label associated with the directed edge 162, a label associated with the directed edge 162, and a label associated with the directed edge 166. In this example, the label associated with the directed edge 158 indicates that the relation represented by the directed edge 158 corresponds to "co-conspirator," the labels associated with the directed edge 160 and 162 indicate that the relation represented by the directed edges 160 and 162 correspond to "traveled to," and the labels associated with the directed edges 164 and 166 indicate that the relations represented by the directed edges 164 and 166 correspond to "fought in."

In some examples, the natural language processor 128 is configured to output the entities 142 and the relations 144 on a rolling basis. For example, the natural language processor 128 may output the entities 142 and the relations 144 as the natural language processor 128 identifies the entities 142 and the relations 144 or may output the entities 142 and the relations 144 at a pre-determined interval. In these examples, the knowledge graph generator 136 may generate and update the knowledge graph 138 based on entities 142 and relations 144 received on a rolling basis.

Thus, in the system 100 of FIG. 1, the processor 122 determines the entities 142 and the relations 144 to be represented in the knowledge graph 138 based on natural language processing selectively performed (after receiving a search query) on fewer than all of the documents in the corpus 104 as opposed to the entire corpus 104, thereby reducing a number of documents on which natural language processing is performed to generate the knowledge graph 138 for the search query 121 as compared to techniques that generate knowledge graphs by performing natural language processing on all available documents. Performing the natural language processing on the subset of documents 123 as opposed to the entire corpus 104 enables the system 100 to generate a knowledge graph in real time (e.g., subsequent to receiving the search query) by avoiding the resource and time extensive costs of performing natural language processing on the entire corpus 104.

Figure 2:
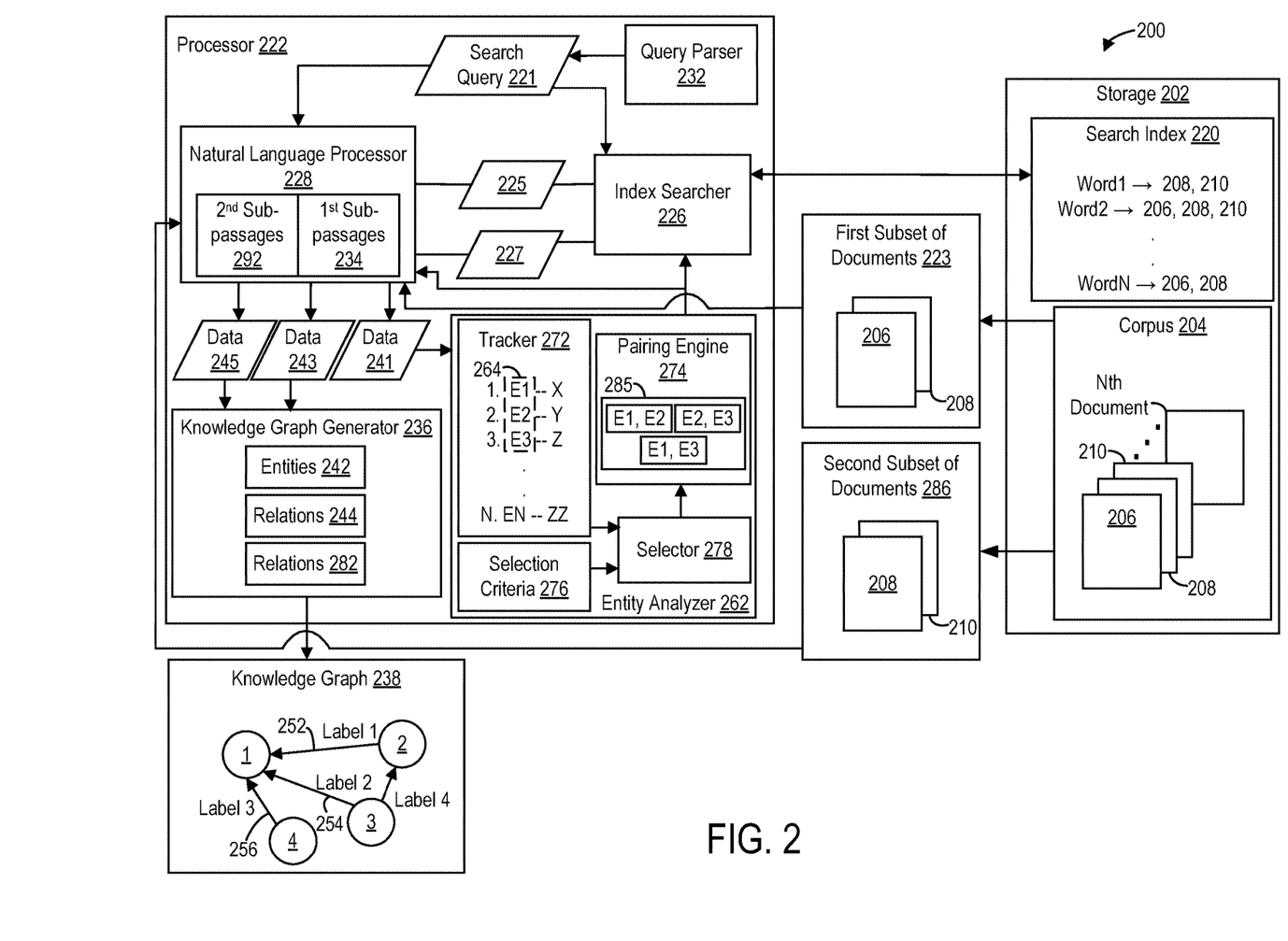
FIG. 2 shows an illustrative block diagram of a system configured to generate a knowledge graph using a search index and an entity analyzer to identify a subset of entities to process to determine secondary relations.

With reference now to FIG. 2, a block diagram of a system 200 configured to generate one or more knowledge graphs in real time is illustrated. In the system 200 of FIG. 2, the query parser 232 is the same as, or is substantially similar to, the query parser 132 of FIG. 1; the search query 221 is the same as, or is substantially similar to, the search query 121 of FIG. 1; the index searcher 226 is the same as, or is substantially similar to, the index searcher 126 of FIG. 1; the storage 202 is the same as, or is substantially similar to, the storage 102 of FIG. 1; the corpus 204 is the same as, or is substantially similar to, the corpus 104 of FIG. 1; and the search index 220 is the same as, or is substantially similar to, the search index 120 of FIG. 1. In the example illustrated in FIG. 2, the corpus 204 of documents includes documents 206, 208, 210 . . . N, where N is greater than or equal to three. Although FIG. 2 illustrates the search index 220 as being stored in the same storage as the corpus 204, in other examples, the search index 220 is stored in a different storage than the corpus 204.

The processor 222 of FIG. 2 is coupled (e.g., physically or via a wireless or wired network) to the search index 220 and the corpus 204 (e.g., coupled to the storage 202) and configured to receive the search query 221 as described above with reference to the processor 122 and the search query 121 of FIG. 1. For example, the query parser 232 may parse a query input entered by a user via a user input to provide the search query 221. The search query 221 may correspond to an entity, which, as non-limiting examples, may correspond to a person, place, or thing. To illustrate, the search query 221 may correspond to the spaceship "USS Enterprise" from the fictional television show and movie "Star Trek."

The index searcher 226 is configured to search the search index 220 according to the search query 221 to determine a first subset of documents 223 that include the search query 221. The index searcher 226 may output search results 225 (e.g., document IDs) that identify the first subset of documents 223. To illustrate using the above example in which the search query 221 corresponds to "USS Enterprise," the Word(s)N may correspond to "USS Enterprise," and the index searcher 226 may search the search index 220 and determine that the documents 206, 208 include the search query 221 based on the search index entry for the Word(s)N. In this example, the first subset of documents 223 corresponds to the documents 206, 208. In this example, the index searcher 226 may output the search results 225 (e.g., document IDs) identifying the documents 206, 208.

The processor 222 includes a natural language processor 228 configured to retrieve or receive the search query 221 and the first subset of documents 223, process the first subset of documents 223 to determine entities 242 and relations 244 that are related to the search query 221, and output data 243 that indicates the entities 242 and the relations 244. In some examples, the natural language processor 228 is configured to receive the search results 225 from the index searcher 226 and retrieve the first subset of documents 223 from the corpus 204. In these examples, in response to receiving the search results 225 from the index searcher 226, the natural language processor 228 may access the corpus 204 to retrieve the first subset of documents 223, and may process the first subset of documents 223 to determine the entities 242 and the relations 244 that are related to the search query 221. In some examples, the natural language processor 228 is configured to process the first subset of documents 223 to identify the entities 242 using dictionary lookups against outside databases (e.g., DBPedia or Freebase), using a heuristic technique based on capitalization patterns, or using the output of a syntactic parser, such as an SG parser (which will group first and last names into a single token, based on the overall syntax of the phrase). However, in other examples, different techniques are used to identify the entities 242. In some examples, the natural language processor 228 is configured to process the first subset of documents 223 to identify the relations 244 using a syntactic parser (such as an SG parser) that will identify common syntactic patterns, statistical techniques like those used in a syntactic parser such as the SIRE toolkit, or graph-based post-processing of complex relations based on those syntactic relations. In an example of a graph-based post-processing of complex relations, the natural language processor 228 includes an automatic annotator (not shown) that marks a relation between two words that are connected by syntactic relations. These syntactic patterns can either be handwritten or inferred from training data.

To illustrate using the above example in which the search query 221 corresponds to "USS Enterprise" and the first subset of documents 223 correspond to the documents 206, 208, the natural language processor 228 may process the documents 206, 208 and determine, based on the processing, that the entities "Jean-Luc Picard," "William Riker," and "Spock" are entities related to the search query 221 USS Enterprise. Additionally or alternatively, the natural language processor 228 may process the documents 206, 208 and determine, based on the processing, relations between the entities Jean-Luc Picard, William Riker, and Spock and the search query 221 USS Enterprise. For example, the natural language processor 228 may process the documents 206, 208 and determine a first relation "captain of" between Jean-Luc Picard and the search query 221 USS Enterprise, a second relation "first officer of" between William Riker and the search query 221 USS Enterprise, and a third relation "science officer of" between Spock and the search query 221 USS Enterprise.

In some examples, the natural language processor 228 is configured to identify first sub-passages 234 that include the search query 221 before processing the first subset of documents 223 to determine the entities 242 and the relations 244 associated with the search query 221. In these examples, the natural language processor 228 limits its natural language processing regarding the search query 221 to the first sub-passages 234 (e.g., as opposed to performing natural language processing on the entirety of the first subset of documents 223). For example, the natural language processor 228 may perform an initial search of the first subset of documents 223 using a text search technique to identify the first sub-passages 234 that include the search query 221 as described above with reference to the sub-passages 134 of FIG. 1. The natural language processor 228 is configured to process the first sub-passages 234 to determine the entities 242 and the relations 244. The initial search (e.g., the text search) of the first subset of documents 223 to identify the first sub-passages 234 may be performed using a relatively quick process compared to the processing used to identify the entities 242 and the relations 244, and may reduce the number of passages that the natural language processor 228 processes in order to identify the entities 242 and the relations 244, thereby reducing a processing time as compared to a natural language processor 228 that processes all passages of the first subset of documents 223 to identify the entities 242 and the relations 244. Furthermore, in some examples, the natural language processor 228 may process the first sub-passages 234 independently. In these examples, the natural language processor 228 may process the first sub-passages 234 in parallel (e.g., using separate processing threads), which may additionally reduce the processing time to identify the entities 242 and the relations 244 as compared to systems that process documents or passages serially to identify the entities 242 and the relations 244.

The processor 222 includes a knowledge graph generator 236 configured to generate a knowledge graph 238 based on the entities 242 and the relations 244. The knowledge graph 238 includes nodes and directed edges. The nodes represent entities (e.g., all subjects and objects) and the directed edges represent the relations. The direction of an edge indicates whether the entities occur as subjects or objects, i.e., edge points from the subject to the object. Different relations are represented via different types of edges (also called edge labels).

To illustrate using the above example in which the entities 242 include Jean-Luc Picard, William Riker, and Spock, and the relations 244 include captain of, first officer of, and science officer of, the knowledge graph 238 may include a node 1 corresponding to the entity USS Enterprise of the search query 221, a node 2 corresponding to Jean-Luc Picard, a node 3 corresponding to William Riker, and a node 4 corresponding to Spock. In this example, the knowledge graph 238 may include a directed edge 252, a directed edge 254, a directed edge 256, a Label 1 associated with the directed edge 252, a Label 2 associated with the directed edge 254, and a Label 3 associated with the directed edge 256. In this example, the Label 1 indicates that the relation represented by the directed edge 252 corresponds to "captain of," the Label 2 indicates that the relation represented by the directed edge 254 corresponds to "first officer of," and the Label 3 indicates that the relation represented by the directed edge 256 corresponds to "science officer of."

The processor 222 additionally includes an entity analyzer 262 configured to determine pairs of the entities 242 to search for secondary relations (e.g., relations between the entities 242 as opposed to relations between the entities 242 and the search query 221). The entity analyzer 262 is configured to track a number of occurrences or instances of the entities 242 identified in the first subset of documents 223. In some examples, the tracker 272 tracks the number of occurrences or instances of the entities 242 using a tracking data structure (e.g., a tracking table). In some examples, each entry of the tracking data structure corresponds to a respective entity of the entities 242, and includes an indication of a number of occurrences or instances of the entity in the first subset of documents 223. To illustrate, the tracker 272 may maintain a tracking table (not shown) that includes a first entry corresponding to a first entity E1 of the entities 242, and the first entry may indicate that the natural language processor 228 has identified 'X' number of occurrences or instances of the first entity E1. As another example, the tracking table may include a second entry corresponding to a second entity E2 of the entities 242, and the second entry may indicate that the natural language processor 228 has identified 'Y' number of occurrences or instances of the second entity E2. As another example, the tracking table may include a third entry corresponding to a third entity E3 of the entities 242, and the third entry may indicate that the natural language processor 228 has identified 'Z' number of occurrences or instances of the third entity E3.

In some examples, the natural language processor 228 is configured to output data 241 each time an instance or occurrence of an entity of the entities 242 is identified in the first subset of documents 223, and the tracker 272 is configured to track the number of occurrences or instances of the entities 242 based on the data 241 from the natural language processor 228. To illustrate, in an example, during processing of a first sub-passage of the first sub-passages 234, the natural language processor 228 determines that the first entity E1 of the entities 242 is related to the search query 221. In response to determining that the first entity E1 is related to the search query 221, the natural language processor 228 outputs, to the entity analyzer 262, the data 241, which includes an indication of a first occurrence or instance of the first entity E1 in the first subset of documents 223. In response to receiving the data 241 that includes an indication of the first occurrence or instance of the first entity E1 in the first subset of documents 223 from the natural language processor 228, the tracker 272 creates and adds an entry corresponding to the first entity E1 to the tracking table and causes the first entry to indicate a single identified occurrence or instance of the first entity E1 in the first subset of documents 223. Subsequent to the natural language processor 228 identifying the first entity E1 in the first sub-passage or subsequent to the natural language processor 228 outputting the data 241 that includes the indication of the first occurrence or instance of the first entity E1 to the entity analyzer 262, the natural language processor 228 identifies a second occurrence or instance of the first entity E1 in a second sub-passage of the one or more first sub-passages 234. In response to identifying the second occurrence of the first entity E1 in the second sub-passage, the natural language processor 228 outputs, to the entity analyzer 262, the data 241, which includes an indication of a second occurrence of the first entity E1 in the first subset of documents 223. In response to receiving the data 241 that indicates a second occurrence or instance of the first entity E1, the tracker 272 updates the tracking data structure such that the entry corresponding to the first entity E1 reflects two occurrences or instances in the first subset of documents 223. Thus, the entity analyzer 262 tracks a number of instances of occurrence of the entities 242 identified by the natural language processor 228.

The entity analyzer 262 includes a selector 278 configured to determine a subset 264 of the entities 242 that satisfy one or more selection criteria 276. For example, the one or more selection criteria 276 may include a threshold number of occurrences, and the selector 278 may determine, for each of the entities 242, whether a number of occurrences of the entity as determined by the tracker 272 satisfies the threshold. To illustrate, in an example, the threshold number of occurrences corresponds to fifteen (15), and the selector 278 is configured to identify each entity of the entities 242 that is determined to occur at least fifteen times in the one or more first sub-passages 234. In this example, the selector 278 accesses the tracking data structure, which, as an example, indicates that fifty (50) occurrences or instances of the entity E1 have been identified, forty (40) occurrences or instances of the entity E2 have been identified, thirty (30) occurrences or instances of the entity E3 have been identified, and that less than fifteen (15) occurrences or instances of all of the other entities E4 . . . EN have been identified. In this example, the entity analyzer 262 determines that the subset 264 of the entities 242 corresponds to the first, second, and third entities E1, E2, and E3.

The entity analyzer 262 includes a pairing engine 274 that is configured to determine pairs 285 of the subset 264 of the entities 242, and to provide the pairs 285 to the index searcher 226. For example, the selector 278 outputs the subset 264 of the entities 242 to the pairing engine 274, and the pairing engine 274 determines all possible pair combinations of the subset 264. To illustrate using the above example in which the subset 264 includes the first entity E1, the second entity E2, and the third entity E3, the pairing engine 274 determines a first pair corresponding to the first entity E1 and the second entity E2, a second pair corresponding to the second entity E2 and the third entity E3, and a third pair corresponding to the first entity E1 and the third entity E3.

The entity analyzer 262 is configured to output the pairs 285 to the index searcher 226. The index searcher 226 is configured to search, for each entity pair of the pairs 285, the search index 220 according to the entity pair to determine a second subset of documents 286 that include both entities of the entity pair. For each entity pair, the index searcher 226 outputs search results 227 (e.g., document IDs) that identify the second subset of documents 286 that the index searcher 226 identifies as including the entity pair. To illustrate using the entity pair E1 and E2 in which the first entity E1 corresponds to Jean Luc Picard and the second entity E2 corresponds to William Riker, the Word(s)1 may correspond to "Jean Luc Picard," and the Word(s)2 may corresponds to "William Riker," and the index searcher 226 may search the search index 220 and determine that the documents 208, 210 include both the first entity E1 (e.g., Jean Luc Picard) and the second entity E2 (William Riker) based on the search index entries for the Word(s)1 and the Word(s)2. In this example, the second subset of documents 286 identified by the index searcher 226 correspond to the documents 208, 210. In this example, the index searcher 226 may output the search results 227 (e.g., document IDs) identifying the documents 208, 210.

The natural language processor 228 is configured to retrieve or receive the indications of the pairs 285 from the pairing engine 274 and to retrieve or receive the second subset of documents 286, process the one or more second subset of documents 286 to determine relations 282 between the pairs 285, and output data 245 indicating the relations 282. In some examples, the natural language processor 228 is configured to receive the search results 227 from the index searcher 226 and retrieve the second subset of documents 286 from the corpus 204. In these examples, in response to receiving the search results 227 from the index searcher 226, the natural language processor 228 may access the corpus 204 to retrieve the second subset of documents 286, and may process the second subset of documents 286 to determine the relations 282. The natural language processor 228 may process the second subset of documents 286 using a syntactic parser (such as an SG parser) that will identify common syntactic patterns, statistical techniques like those used in a syntactic parser such as the SIRE toolkit, or graph-based post-processing of complex relations based on those syntactic relations.

To illustrate using the entity pair E1 and E2 in which the first entity E1 corresponds to Jean Luc Picard and the second entity E2 corresponds to William Riker, and the second subset of documents 286 correspond to the documents 208, 210, the natural language processor 228 may process the documents 208, 210 and determine, based on the processing, a "subordinate" relation between the entities "Jean-Luc Picard" and "William Riker."

In some examples, the natural language processor 228 is configured to identify second sub-passages 292 that include an entity pair before processing the second subset of documents 286 to determine the relations 282 associated with the entity pair. In these examples, the natural language processor 228 limits its processing regarding the entity pair to the one or more second sub-passages 292 (e.g., as opposed to processing the entirety of the second subset of documents 286). For example, the natural language processor 228 may perform an initial search of the second subset of documents 286 using a text search technique to identify one or more second sub-passages 292 that include the entity pair as described above with reference to the first sub-passages 234, and may then process the one or more second sub-passages 292 to determine the relations 282. The initial search (e.g., the text search) of the second subset of documents 286 to identify the one or more second sub-passages 292 may be performed using a relatively quick process compared to the processing used to identify the relations 282, and may reduce the number of passages that the natural language processor 228 processes in order to identify the relations 282, thereby reducing a processing time as compared to a natural language processor 228 that processes all passages of the second subset of documents 286 to identify relations. Furthermore, in some examples, the natural language processor 228 may process the second sub-passages 292 independently. In these examples, the natural language processor 228 may process the second sub-passages 292 in parallel (e.g., using separate processing threads), which may additionally reduce the processing time to identify relations as compared to systems that process documents or passages serially to identify the relations.

The knowledge graph generator 236 is configured to update the knowledge graph 238 based on the relations 282. For example, as the natural language processor 228 identifies the relations 282, the knowledge graph generator 236 may update the knowledge graph 238 to include directed edges that represent the relations 282 and labels that describe the relations 282. To illustrate using the above example in which the relations 282 include a "subordinate" relation between Jean Luc Picard (e.g., node 2 in the example knowledge graph 238) and William Riker (e.g., node 3 in the example knowledge graph 238), the knowledge graph generator 236 may update the knowledge graph 238 to include a directed edge from node 3 to node 2 and a Label 4 that indicates a "subordinate" relation associated with the directed edge from the node 3 to the node 2.

Figure 3:
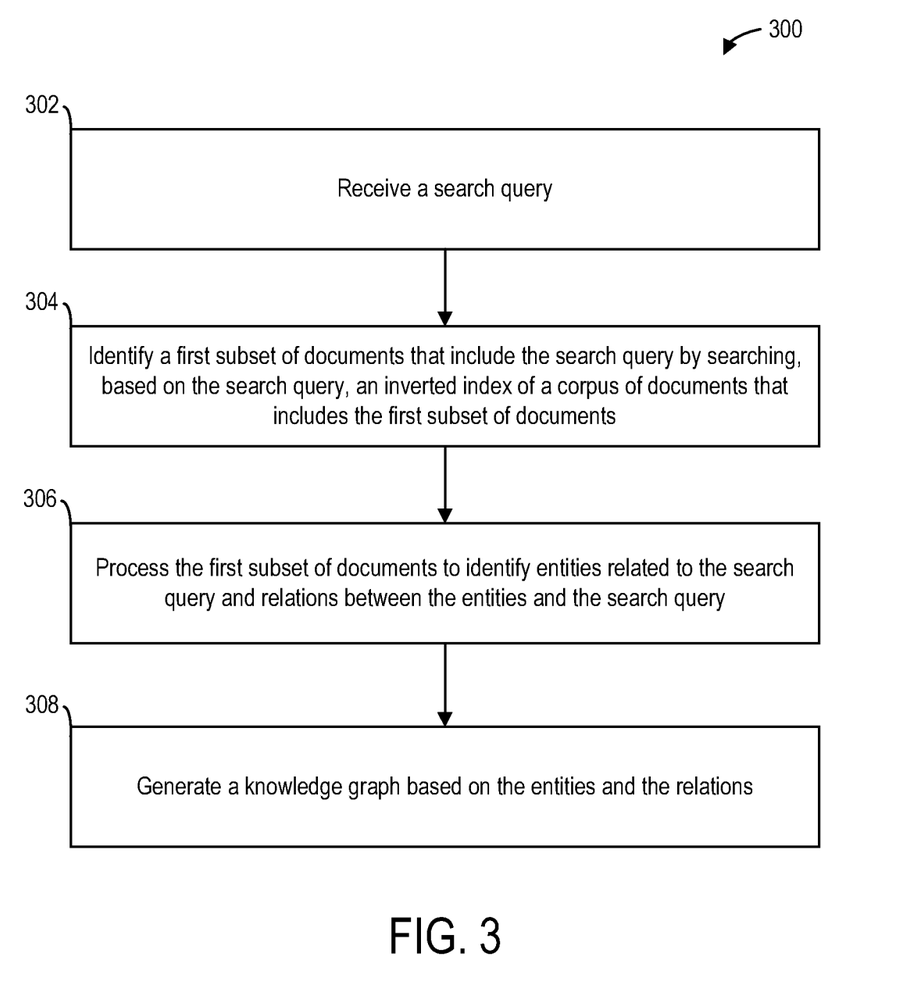
FIG. 3 shows a flowchart illustrating aspects of operations that may be performed to generate the knowledge graph using a search index in accordance with various embodiments.

With reference to FIG. 3, a computer-implemented method 300 of generating a knowledge graph is illustrated. The computer-implemented method 300 may be performed by one or more components of the system 100 of FIG. 1 or one or more components of the system 200 of FIG. 2. For example, the computer-implemented method 300 may be performed by the processor 122 or 222 and the storage 102 or 202 of FIGS. 1 and 2.

The computer-implemented method 300 includes receiving, at 302, a search query. The search query may be received by an index searcher (e.g., the index searcher 126 or 226 of FIG. 1 or 2) from a query parser as described above with reference to the query parser 132 and 232 of FIGS. 1 and 2. The search query may correspond to the search query 121 or the search query 221 described above with reference to FIGS. 1 and 2. In some examples, the search query includes a single entity as described above with reference to FIGS. 1 and 2. In other examples, the search query includes multiple entities, as described above with reference to FIG. 1.

The computer-implemented method 300 further includes, at 304 and subsequent to receiving the search query, identifying a first subset of documents that include the search query by searching, based on the search query, an inverted index of a corpus of documents that includes the first subset of documents. The first subset of documents may be identified by an index searcher, such as the index searcher 126 or the index searcher 226 of FIG. 1 or 2. The inverted index maps from content (e.g., words or numbers) of a corpus of documents to the content's locations in corresponding documents of the corpus that include the content. For example, the search index may correspond to the search index 120 of FIG. 1 or the search index 220 of FIG. 2. As an example, the corpus of documents may correspond to the corpus 104 of documents of FIG. 1 or the corpus 204 of documents of FIG. 2. The first subset of documents may correspond to the first subset of documents 123 of FIG. 1 or the first subset of documents 223 of FIG. 2. The first subset of documents includes fewer documents than the corpus of documents.

The index searcher 126 may output search results (e.g., document IDs) that identify the first subset of documents that the index searcher identifies as including the search query. The computer-implemented method 300 further includes, at 306, processing the first subset of documents to identify entities related to the search query and relations between the entities and the search query. In some examples, the entities correspond to the entities 142 or 242 described above with reference to FIG. 1 or 2, and the relations correspond to the relations 144 or 244 described above with reference to FIG. 1 or 2. For example, a natural language processor, such as the natural language processor 128 or 228 of FIGS. 1 and 2, may receive document IDs that identify the first subset of documents, and may retrieve the first subset of documents from the corpus. The natural language processor may also receive the search query, and may perform natural language processing on the first subset of documents to identify the entities and the relations as described above with reference to FIGS. 1 and 2.

In some examples, processing, at 306, the first subset of documents to identify the entities and the relations includes identifying sub-passages within the first subset of documents that include the search query. For example, the natural language processor may process the first subset of documents using a text search technique to identify sub-passages within the first subset of documents that include the search query as described above with reference to FIGS. 1 and 2. In examples in which sub-passages are identified, processing, at 306, the first subset of documents to identify the entities and the relations further includes performing natural language processing on the sub-passages to identify the entities and the relations. The initial search of the first subset of documents to identify the sub-passages may be performed using a relatively quick process compared to the processing used to identify the entities and the relations, and may reduce the number of passages that the natural language processor processes in order to identify the entities and the relations, thereby reducing a processing time as compared to a natural language processor that processes all passages of the first subset of documents to identify the entities and the relations. Furthermore, in some examples, the processor may process the one or more first sub-passages independently. In these examples, the processor may process the one or more first sub-passages in parallel (e.g., using separate processing threads), which may additionally reduce the processing time to identify entities and relations as compared to systems that process documents or passages serially to identify the entities and relations.

The computer-implemented method 300 further includes, at 308, generating a knowledge graph based on the entities and the relations. The knowledge graph may correspond to and be generated (e.g., by the knowledge graph generator 136 or 236 of FIG. 1 or 2) as described above with reference to the knowledge graph 138 or 238 of FIG. 1 or 2. For example, the knowledge graph may include nodes corresponding to the entities and directed edges corresponding to the relations.

Figure 4:
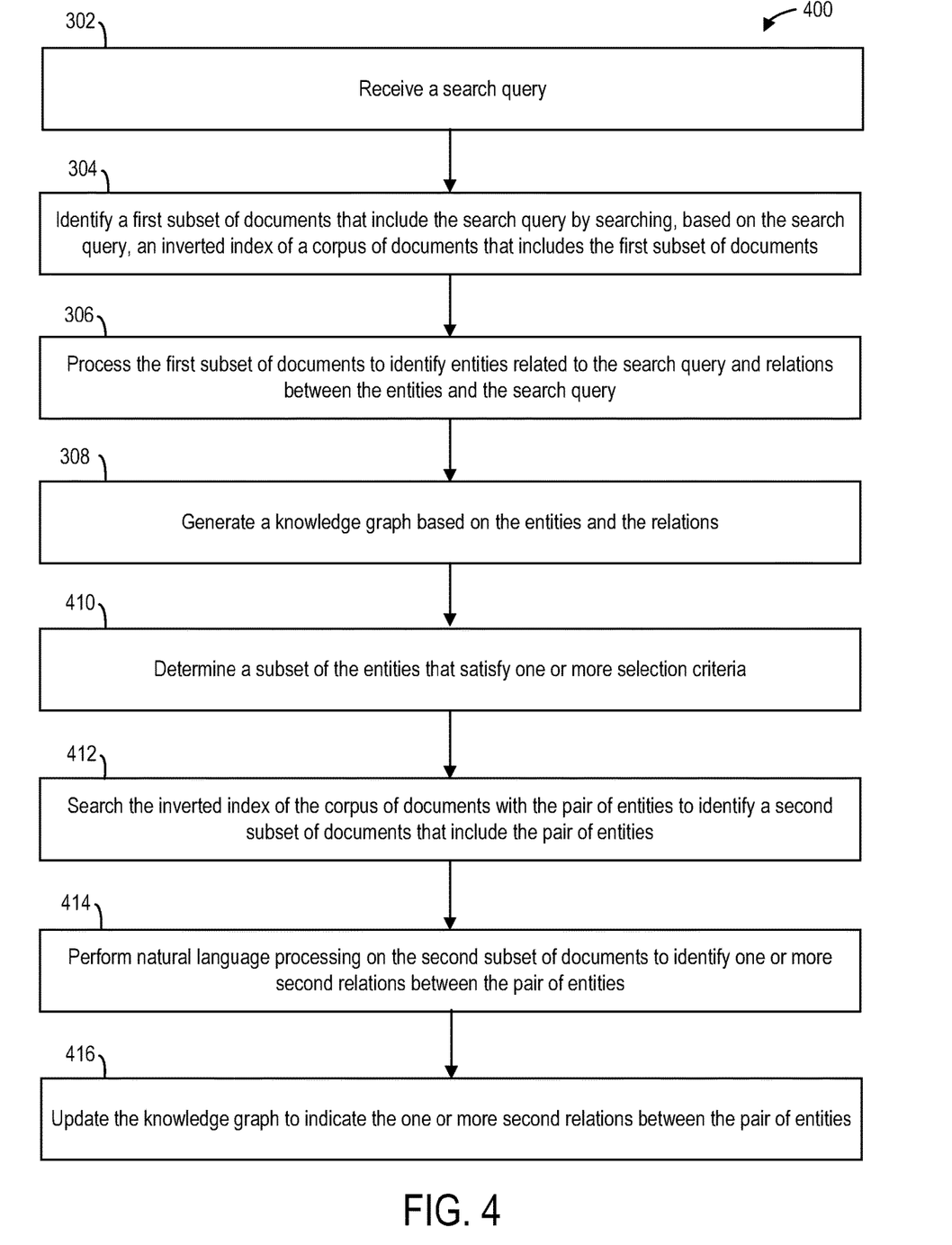
FIG. 4 shows a flowchart illustrating aspects of operations that may be performed to generate the knowledge graph using a search index in accordance with various embodiments.

With reference to FIG. 4, a computer-implemented method 400 of generating a knowledge graph is illustrated. The computer-implemented method 400 may be performed by the system 200 of FIG. 2. The computer-implemented method 400 includes 302, 304, 306, and 308 described above with reference to the computer-implemented method 300 of FIG. 3. The computer-implemented method 400 additionally includes, at 410, determining a subset of the entities that satisfy one or more selection criteria. For example, the processor 222 of FIG. 2 may include an entity analyzer (e.g., the entity analyzer 262 of FIG. 2) configured to determine entities that occur at least a threshold number of times in the first subset of documents as described above with reference to FIG. 2.

The computer-implemented method 400 further includes, for each pair of entities of the subset of the entities, searching, at 412, the inverted index of the corpus of documents with the pair of entities to identify a second subset of documents that include the pair of entities. For example, the entity analyzer 262 of FIG. 2 may determine pairs of the entities that satisfy the selection criteria, and may provide the pairs of entities to the index searcher 226 of FIG. 2. The index searcher may be configured to query the search index to identify the second subset of documents 286 as described above with reference to FIG. 2.

The computer-implemented method 400 further includes, for each pair of entities of the subset of the entities, performing, at 414, natural language processing on the second subset of documents to identify one or more second relations between the pair of entities. For example, the natural language processor 228 of FIG. 2 may process the second subset of documents 286 to identify one or more second relations 282 between the pair of entities as described above with reference to FIG. 2.

The computer-implemented method 400 further includes, for each pair of entities of the subset of the entities, updating, at 416, the knowledge graph to indicate the one or more second relations between the pair of entities. For example, the knowledge graph generator 236 of FIG. 2 may update the knowledge graph 238 to include the one or more second relations 282 as described above with reference to FIG. 2.

Figure 5:
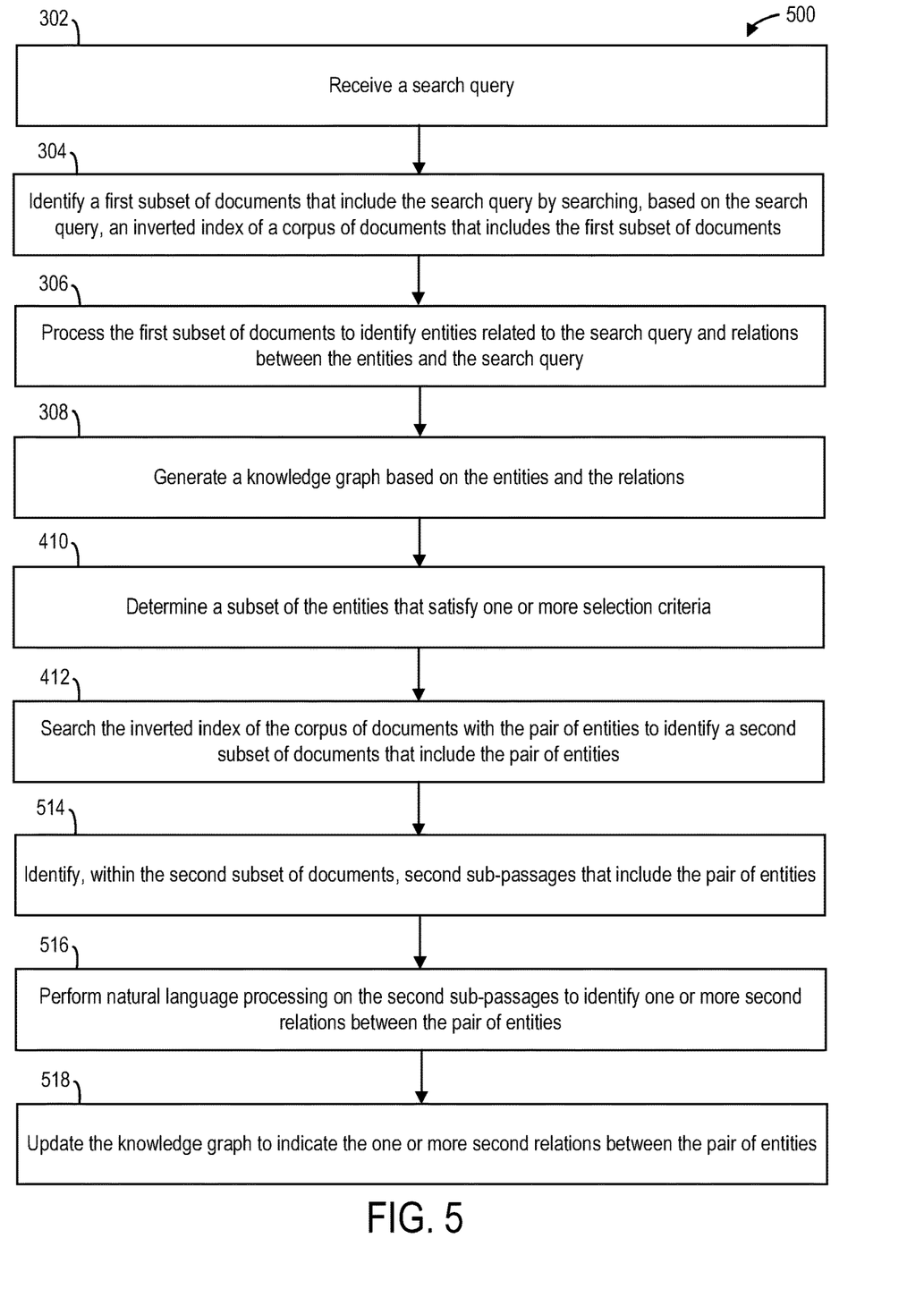
FIG. 5 shows a flowchart illustrating aspects of operations that may be performed to generate the knowledge graph using a search index in accordance with various embodiments.

With reference to FIG. 5, a computer-implemented method 500 of generating a knowledge graph is illustrated. The computer-implemented method 500 may be performed by the system 200 of FIG. 2. The computer-implemented method 500 includes 302, 304, 306, 308, 410, and 412 described above with reference to the computer-implemented methods 300 and 400 of FIGS. 3 and 4.

The computer-implemented method 500 further includes identifying, at 514, within the second subset of documents, second sub-passages that include the pair of entities. For example, the natural language processor 228 of FIG. 2 may identify, within the second subset of documents 286, the second sub-passages 292 as described above with reference to FIG. 2.

The computer-implemented method 500 further includes, for each pair of entities of the subset of the entities, performing, at 516, natural language processing on the second sub-passages to identify one or more second relations between the pair of entities. For example, the natural language processor 228 of FIG. 2 may process the second sub-passages 292 to identify one or more second relations 282 between the pair of entities as described above with reference to FIG. 2.

The computer-implemented method 500 further includes, for each pair of entities of the subset of the entities, updating, at 518, the knowledge graph to indicate the one or more second relations between the pair of entities. For example, the knowledge graph generator 236 of FIG. 2 may update the knowledge graph 238 to include the one or more second relations 282 as described above with reference to FIG. 2.

Figure 6:
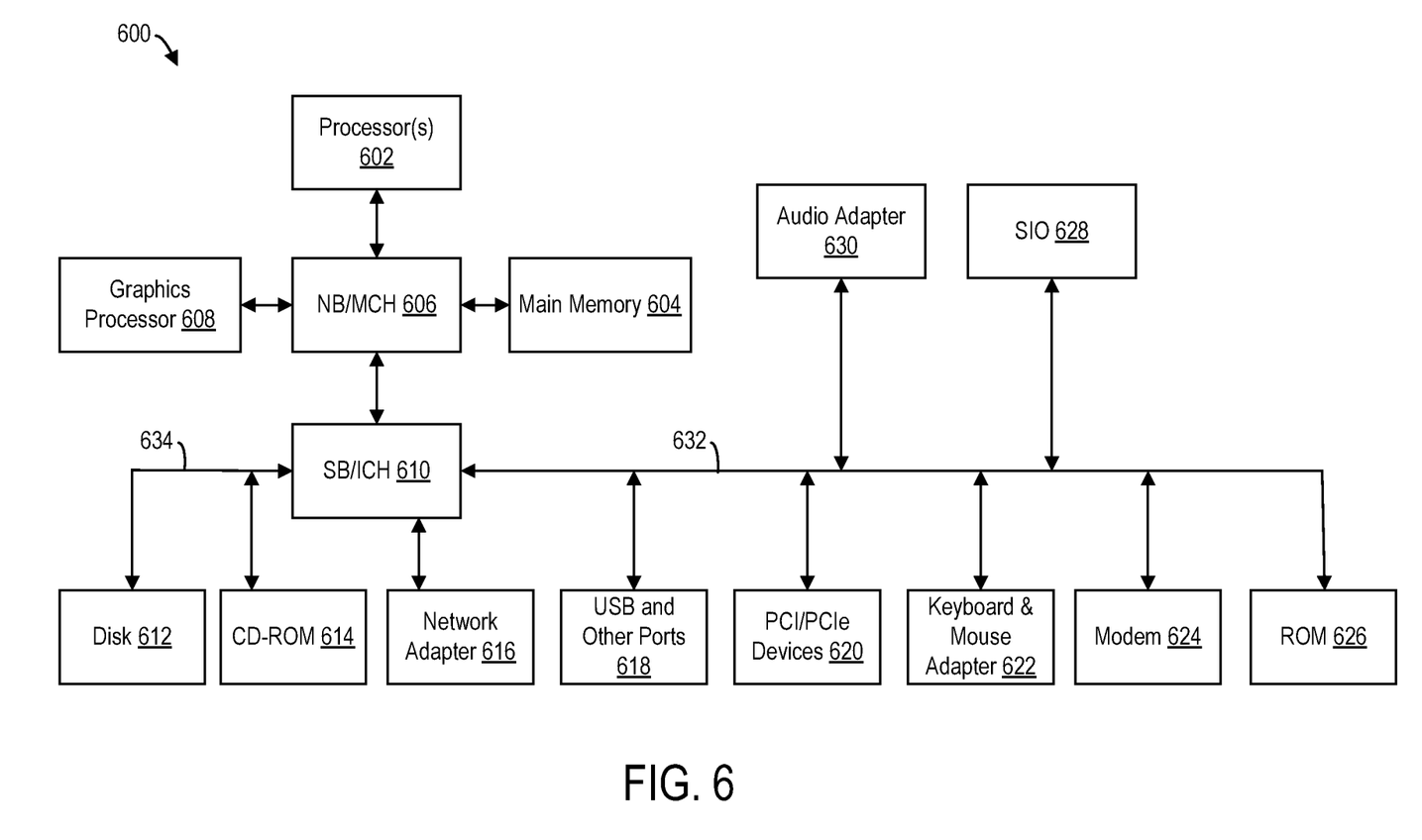
FIG. 6 shows an illustrative block diagram of an example data processing system that can be applied to implement embodiments of the present disclosure.

FIG. 6 is a block diagram of an example data processing system in which aspects of the illustrative embodiments may be implemented. Data processing system 600 is an example of a computer that can be applied to implement the system 100 of FIG. 1 or the system 200 of FIG. 2 and in which computer usable code or instructions implementing the processes for illustrative embodiments of the present disclosure may be located. In one illustrative embodiment, FIG. 6 represents a computing device that implements the system 100 of FIG. 1 or the system 200 of FIG. 2 augmented to include the additional mechanisms of the illustrative embodiments described hereafter.

In the depicted example, data processing system 600 employs a hub architecture including north bridge and memory controller hub (NB/MCH) 606 and south bridge and input/output (I/O) controller hub (SB/ICH) 610. Processor(s) 602, main memory 604, and graphics processor 608 are connected to NB/MCH 606. Graphics processor 608 may be connected to NB/MCH 606 through an accelerated graphics port (AGP).

In the depicted example, local area network (LAN) adapter 616 connects to SB/ICH 610. Audio adapter 630, keyboard and mouse adapter 622, modem 624, ROM 626, hard disk drive (HDD) 612, CD-ROM drive 614, universal serial bus (USB) ports and other communication ports 618, and peripheral component interconnect (PCI) or PCI Express (PCIe) devices 620 connect to SB/ICH 610 through bus 632 and bus 634. PCI/PCIe devices 620 may include, for example, Ethernet adapters, add-in cards, and personal computer (PC) cards for notebook computers. PCI uses a card bus controller, while PCIe does not. ROM 626 may be, for example, a flash basic input/output system (BIOS).

HDD 612 and CD-ROM drive 614 connect to SB/ICH 610 through bus 634. HDD 612 and CD-ROM drive 614 may use, for example, an integrated drive electronics (IDE) or serial advanced technology attachment (SATA) interface. Super I/O (SIO) device 628 may be connected to SB/ICH 610.

An operating system runs on processor(s) 602. The operating system coordinates and provides control of various components within the data processing system 600 in FIG. 6. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 600.

In some embodiments, data processing system 600 may be, for example, an IBM® eServer™ System p® computer system, running the Advanced Interactive Executive (AIX®) operating system or the LINUX® operating system. Data processing system 600 may be a symmetric multiprocessor (SMP) system including a plurality of processors 602. Alternatively, a single processor system may be employed.

Instructions for the operating system, the object-oriented programming system, and applications or programs are located on storage devices, such as HDD 612, and may be loaded into main memory 604 for execution by processor(s) 602. The processes for illustrative embodiments of the present disclosure may be performed by processor(s) 602 using computer usable program code, which may be located in a memory such as, for example, main memory 604, ROM 626, or in one or more peripheral devices 612 and 614, for example.

A bus system, such as bus 632 or bus 634 as shown in FIG. 6, may include one or more buses. The bus system may be implemented using any type of communication fabric or architecture that provides for a transfer of data between different components or devices attached to the fabric or architecture. A communication unit, such as modem 624 or LAN adapter 616 of FIG. 6, may include one or more devices used to transmit and receive data. A memory may be, for example, main memory 604, ROM 626, or a cache such as found in NB/MCH 606 in FIG. 6.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, an SRAM, a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a search query; and
   after receiving the search query:
      identifying a first subset of documents that include the search query by searching, based on the search query, an inverted index of a corpus of documents that includes the first subset of documents;
      processing the first subset of documents to identify entities related to the search query and relations between the entities and the search query;
      generating a knowledge graph based on the entities and the relations;
      determining a subset of the entities that occur in the first subset of documents greater than a predetermined threshold number of occurrences;
      determining all possible pair combinations of the determined subset of the entities; and
      searching the inverted index based on the determined subset of the entities according to the determined pair combinations of the determined subset of the entities.

2. The computer-implemented method of claim 1, wherein the first subset of documents includes fewer documents than the corpus of documents, and wherein the first subset of documents is processed in parallel to identify the entities and the relations.

3. The computer-implemented method of claim 1, wherein processing the first subset of documents to identify the entities and the relations comprises:
   identifying sub-passages within the first subset of documents that include the search query; and
   performing natural language processing on the sub-passages to identify the entities and the relations.

4. The computer-implemented method of claim 3, wherein the sub-passages are processed in parallel to identify the entities and the relations.

5. The computer-implemented method of claim 1, further comprising determining a subset of the entities that satisfy one or more selection criteria.

6. The computer-implemented method of claim 5, further comprising, for each pair of entities of the subset of the entities:
 searching the inverted index of the corpus of documents with the pair of entities to identify a second subset of documents that include the pair of entities;
 performing natural language processing on the second subset of documents to identify one or more second relations between the pair of entities; and
 updating the knowledge graph to indicate the one or more second relations between the pair of entities.

7. The computer-implemented method of claim 5, further comprising, for each pair of entities of the subset of the entities:
 searching the inverted index of the corpus of documents with the pair of entities to identify a second subset of documents that include the pair of entities;
 identifying, within the second subset of documents, second sub-passages that include the pair of entities;
 performing natural language processing on the second sub-passages to identify one or more second relations between the pair of entities; and
 updating the knowledge graph to indicate the one or more second relations between the pair of entities.

8. A method, comprising:
 receiving a search query;
 identifying a first subset of documents that include the search query by searching, based on the search query, an inverted index of a corpus of documents that includes the first subset of documents;
 performing natural language processing of the first subset of documents to identify entities related to the search query and relations between the entities and the search query;
 determining a subset of the entities that occur in the first subset of documents greater than a predetermined threshold number of occurrences;
 searching the inverted index based on the determined subset of the entities for the all possible pair combinations to identify a second subset of documents that include at least one of the pairs of entities.

9. The method of claim 8, further comprising:
 identifying, within the second subset of documents, second sub-passages that include the pair of entities; and
 performing natural language processing on the second sub-passages to identify one or more second relations between the pair of entities.

10. The method of claim 8, further comprising generating a knowledge graph based on the entities and the relations.

11. The method of claim 10, further comprising updating the knowledge graph to indicate one or more second relations between pairs of the entities.

12. The method of claim 8, wherein the first subset of documents includes fewer documents than the corpus of documents, and wherein the first subset of documents is processed in parallel to identify the entities and the relations.

13. The method of claim 8, wherein at least one entry in the inverted index identifies multiple documents of the corpus of documents.

14. A method, comprising:
 receiving a search query;
 searching, based on the search query, an inverted index of a corpus of documents to identify a first subset of documents that include the search query and are included in the corpus of documents;
 performing natural language processing of the first subset of documents to identify entities related to the search query and relations between each of the entities and the search query;
 generating a knowledge graph based on the entities and the relations;
 determining a subset of the entities that occur in the first subset of documents greater than a predetermined threshold number of occurrences;
 determining all possible pair combinations of the determined subset of the entities;
 searching the inverted index based on the determined subset of the entities for the all possible pair combinations to identify a second subset of documents that include at least one of the pairs of entities;
 updating the knowledge graph based on the second subset of documents.

15. The method of claim 14, wherein updating the knowledge graph based on the second subset of documents comprises, for each pair of entities of the subset of the entities:
 identifying, within the second subset of documents, sub-passages that include the pairs of entities;
 performing natural language processing on the sub-passages to identify one or more second relations between the pairs of entities; and
 updating the knowledge graph to indicate the one or more second relations between the pairs of entities.

16. The method of claim 15, wherein each of the sub-passages is a respective sentence.

17. The method of claim 14, wherein the inverted index stores correspondences between words and documents of the corpus of documents that include the words, and wherein querying the inverted index of the corpus of documents based on the search query includes querying the inverted index with each word in the search query.

18. The method of claim 14, wherein the first subset of documents includes fewer documents than the corpus of documents, and wherein the first subset of documents is processed in parallel to identify the entities and the relations.

19. The method of claim 14, wherein at least one entry in the inverted index identifies multiple documents of the corpus of documents.

* * * * *